(12) United States Patent
Knight

(10) Patent No.: US 10,314,433 B1
(45) Date of Patent: Jun. 11, 2019

(54) BARBEQUE OVEN

(71) Applicant: David B. Knight & Associates, Inc., Cape Girardeau, MO (US)

(72) Inventor: David B. Knight, Cape Girardeau, MO (US)

(73) Assignee: David B. Knight & Associates, Inc., Cape Girardeau, MO (US)

( * ) Notice: Subject to any disclaimer, the term of this patent is extended or adjusted under 35 U.S.C. 154(b) by 592 days.

(21) Appl. No.: 14/486,742

(22) Filed: Sep. 15, 2014

Related U.S. Application Data

(63) Continuation of application No. 12/776,825, filed on May 10, 2010, now Pat. No. 8,833,360.

(51) Int. Cl.
 A47J 37/07 (2006.01)

(52) U.S. Cl.
 CPC .................. A47J 37/0754 (2013.01)

(58) Field of Classification Search
 None
 See application file for complete search history.

(56) References Cited

U.S. PATENT DOCUMENTS

| | | |
|---|---|---|
| 1,274,276 A | 7/1918 | Kaslaitis |
| 1,570,489 A | 1/1926 | Hill |
| 2,147,801 A | 2/1939 | Scanlan |
| 2,339,365 A | 1/1944 | Guilder |
| 2,510,856 A | 6/1950 | Bettencourt |
| 2,558,569 A | 6/1951 | Koch |
| 2,833,201 A | 5/1958 | Simank |
| 2,950,669 A | 8/1960 | Terry |
| 2,956,497 A | 10/1960 | Bernstein |
| 3,086,698 A | 4/1963 | Goldstein |
| 3,326,201 A | 6/1967 | Murray |
| 3,364,912 A | 1/1968 | Dills et al. |
| 3,397,632 A | 8/1968 | Moler |
| 3,474,225 A | 10/1969 | Leedy |
| 3,477,360 A | 11/1969 | Raney |
| 3,658,047 A | 4/1972 | Happel |
| 3,665,840 A | 5/1972 | Horany |
| 3,669,041 A | 6/1972 | Schworer |
| 3,861,290 A | 1/1975 | Ringo |
| 3,882,767 A | 5/1975 | Oyler et al. |

(Continued)

OTHER PUBLICATIONS

Office Action dated Dec. 26, 2012, U.S. Appl. No. 12/889,237, 27 pages.

(Continued)

*Primary Examiner* — Steven B McAllister
*Assistant Examiner* — John E Bargero
(74) *Attorney, Agent, or Firm* — Stinson Leonard Street LLP

(57) ABSTRACT

An oven for cooking foods includes a housing having a fire chamber and a cooking chamber disposed generally above the fire chamber. A vessel is receivable in the fire chamber and is adapted to hold combustible material therein to generate heat and smoke for cooking food in the cooking chamber. A blower is mounted on the housing. The blower is selectively operable to move air. A tube is attached to an outlet of the blower and extends into the fire chamber such that when the vessel is received in the fire chamber the tube extends to a position adjacent the vessel so that air from the blower is blown directly into the vessel without first passing a heating element. The oven does not require supplemental heat from a burner or similar heating element.

16 Claims, 8 Drawing Sheets

(56) References Cited

U.S. PATENT DOCUMENTS

| | | |
|---|---|---|
| 4,010,729 A | 3/1977 | Egli |
| 4,263,887 A | 4/1981 | Dowdall |
| 4,287,870 A | 9/1981 | Johnson |
| 4,300,523 A | 11/1981 | Robertson et al. |
| 4,307,703 A | 12/1981 | Russo |
| 4,344,358 A | 8/1982 | Maurer |
| 4,457,292 A | 7/1984 | Jorgensen et al. |
| 4,510,854 A | 4/1985 | Robertson |
| 4,574,689 A | 3/1986 | Robertson |
| 4,791,909 A | 12/1988 | Kalthoff |
| 4,802,459 A | 2/1989 | McFadden et al. |
| 4,819,614 A | 4/1989 | Hitch |
| 4,823,684 A | 4/1989 | Traeger et al. |
| 5,154,159 A | 10/1992 | Knafelc et al. |
| 5,158,066 A | 10/1992 | Dodgen |
| 5,176,124 A | 1/1993 | Wrasse |
| 5,478,985 A | 12/1995 | Hoetzl et al. |
| 5,570,627 A | 11/1996 | Dahlstrom et al. |
| 5,704,278 A | 1/1998 | Cross |
| 5,711,209 A | 1/1998 | Guines |
| 6,113,386 A | 9/2000 | Shannon et al. |
| 6,810,792 B1 | 11/2004 | Knight |
| 7,060,942 B2 | 6/2006 | Friedl et al. |
| D534,755 S | 1/2007 | Knight |
| 7,241,977 B2 | 7/2007 | Friedl et al. |
| 7,409,904 B2 | 8/2008 | Blumel et al. |
| 7,431,029 B2 | 10/2008 | Kim et al. |
| 7,451,691 B2 | 11/2008 | Robertson |
| 7,766,003 B2 | 8/2010 | Kim et al. |
| 2003/0172919 A1 | 9/2003 | Rabas et al. |
| 2009/0056695 A1 | 3/2009 | Cosgrove |
| 2010/0003387 A1 | 1/2010 | Knight |
| 2011/0275023 A1 | 11/2011 | Knight |
| 2012/0073557 A1 | 3/2012 | Knight |

OTHER PUBLICATIONS

Office Action dated Mar. 18, 2013, U.S. Appl. No. 12/776,825, 28 pages.

Office Action dated Nov. 6, 2013, U.S. Appl. No. 12/776,825, 19 pages.

BARBEQUE OVEN

CROSS-REFERENCE TO RELATED APPLICATION

This application is a continuation of U.S. Ser. No. 12/776,825, filed May 10, 2010, the entirety of which is incorporated herein by reference.

FIELD OF THE INVENTION

The present invention generally relates to barbecue ovens, and in particular to a barbecue oven having controlled heat and smoke flow.

BACKGROUND OF THE INVENTION

Barbecuing is a traditional cooking process that typically involves the cooking of foods by exposing them to relatively low temperature smoke for a number of hours. The structure used for barbecuing typically includes a heating or fire chamber, a cooking chamber and a conduit or flue through which smoke and heated combustion gases are transported from the fire chamber to the cooking chamber. Smoke and heat is produced by burning a smoke producing substance in the fire chamber such as wood. The wood is burned using a heating element such as a gas or electric burner. These burners are costly and it may be difficult to control the heat generated with the burners without additional devices such as sophisticated logic thermometers, dampers, vents and/or baffles. Accordingly, there exists a need for a barbecue oven that adequately controls the heat generated in the oven without using a burner and without the need for complex controllers or mechanical devices like dampers, vents or baffles.

SUMMARY OF THE INVENTION

In one aspect, an oven for cooking foods generally comprises a housing including a fire chamber and a cooking chamber disposed generally above the fire chamber. A vessel is receivable in the fire chamber and is adapted to hold combustible material therein to generate heat and smoke for cooking food in the cooking chamber. A blower is mounted on the housing. The blower is selectively operable to move air. A tube is attached to an outlet of the blower and extends into the fire chamber such that when the vessel is received in the fire chamber the tube extends to a position adjacent the vessel so that air from the blower is blown directly into the vessel without first passing a heating element.

In another aspect, an oven for cooking foods generally comprises a housing including a fire chamber and a cooking chamber disposed generally above the fire chamber. A vessel is receivable in the fire chamber and is adapted to hold combustible material therein to generate heat and smoke for cooking food in the cooking chamber. A blower is mounted on the housing. The blower is selectively operable to move air. A tube is attached to an outlet of the blower and extends into the fire chamber through an opening in the housing. The tube has an interior surface area and a generally square shaped cross section having an area. The ratio of the interior surface area to cross sectional area is at least about 20 to 1.

In yet another aspect, an oven for cooking food generally comprises a housing including a fire chamber having a volume and a cooking chamber disposed generally above the fire chamber. A vessel is receivable in the fire chamber and is adapted to hold combustible material therein to generate heat and smoke for cooking food in the cooking chamber. A blower is mounted on the housing. A tube is attached to an outlet of the blower and extends into the fire chamber through an opening in the housing. The blower is configured to blow air through the tube to produce a volumetric flow rate generally at an end of the tube in the fire chamber. The ratio of the volume of the fire chamber to the volumetric flow rate generally at the end of the tube is between about 1 to 1 and about 1 to 1.5.

In still another aspect, an oven for cooking food generally comprises a housing having a fire chamber and a cooking chamber disposed generally above the fire chamber. The fire chamber is configured to receive a vessel for holding combustible material therein to generate heat and smoke for cooking food in the cooking chamber. The oven further comprises a blower for blowing air into the fire chamber. The fire chamber is adapted to be substantially sealed from inflow of air surrounding the oven except from the blower.

In another aspect, a method of supplying heat to an oven in a controlled temperature range without the use of gas or electric burners generally comprises the steps of filling a vessel adapted for receipt in a fire chamber of the oven with charcoal. Placing the vessel in the fire chamber. Selectively blowing air into the filled vessel with a blower attached to the oven, the blower blowing air through a tube attached to an outlet of the blower and extending into the fire chamber to a position adjacent the vessel such that the air from the blower is blown directly into the vessel without first passing a heating element OR OTHER COMPONENT PART OF THE DEVICE. WE DON'T USE ANYTHING ELSE TO GET AIR IN THERE.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

Figure 1:
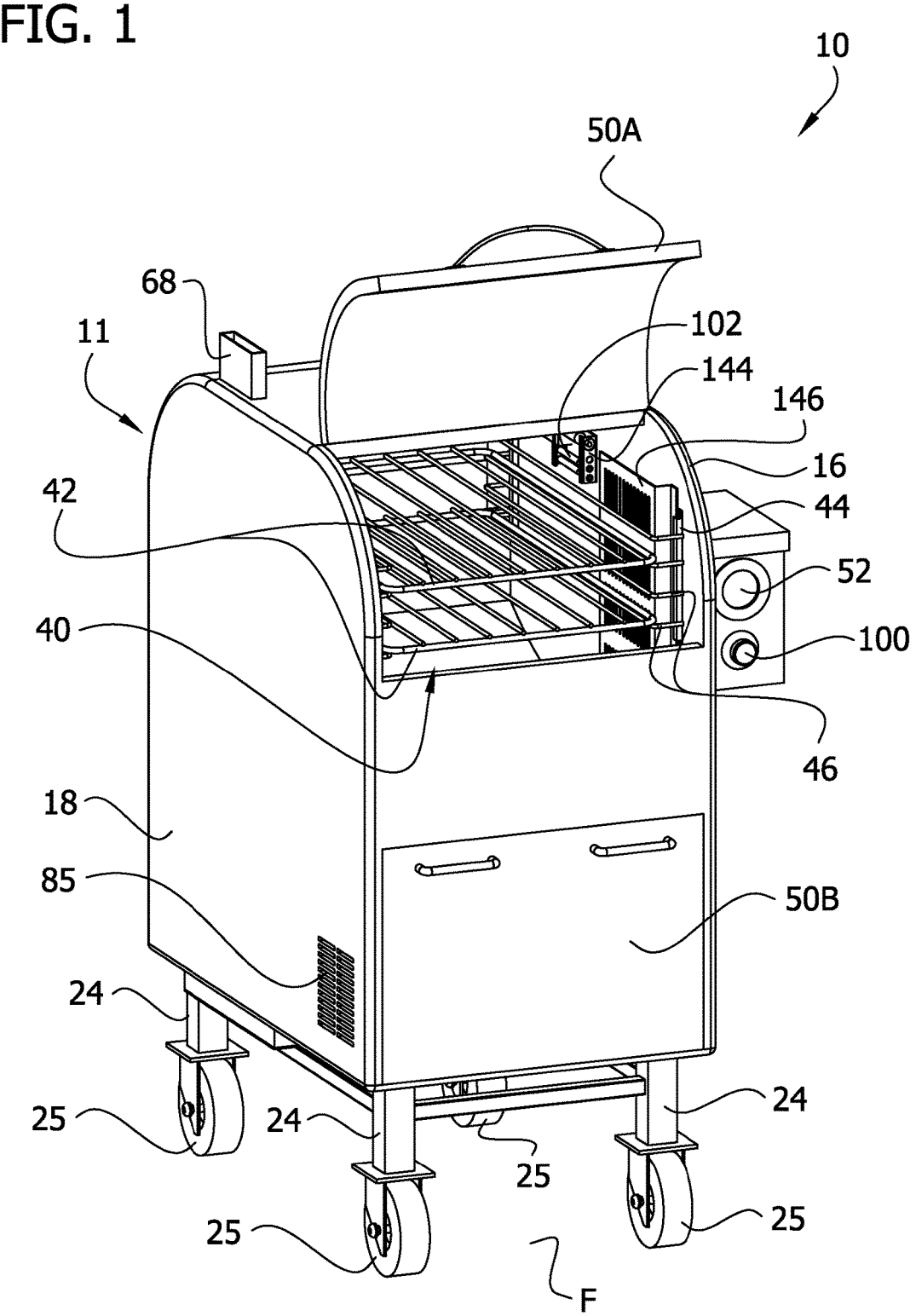
FIG. 1 is a left side perspective of a barbecue oven of the present invention with a door open to show internal construction.
Figure 2:
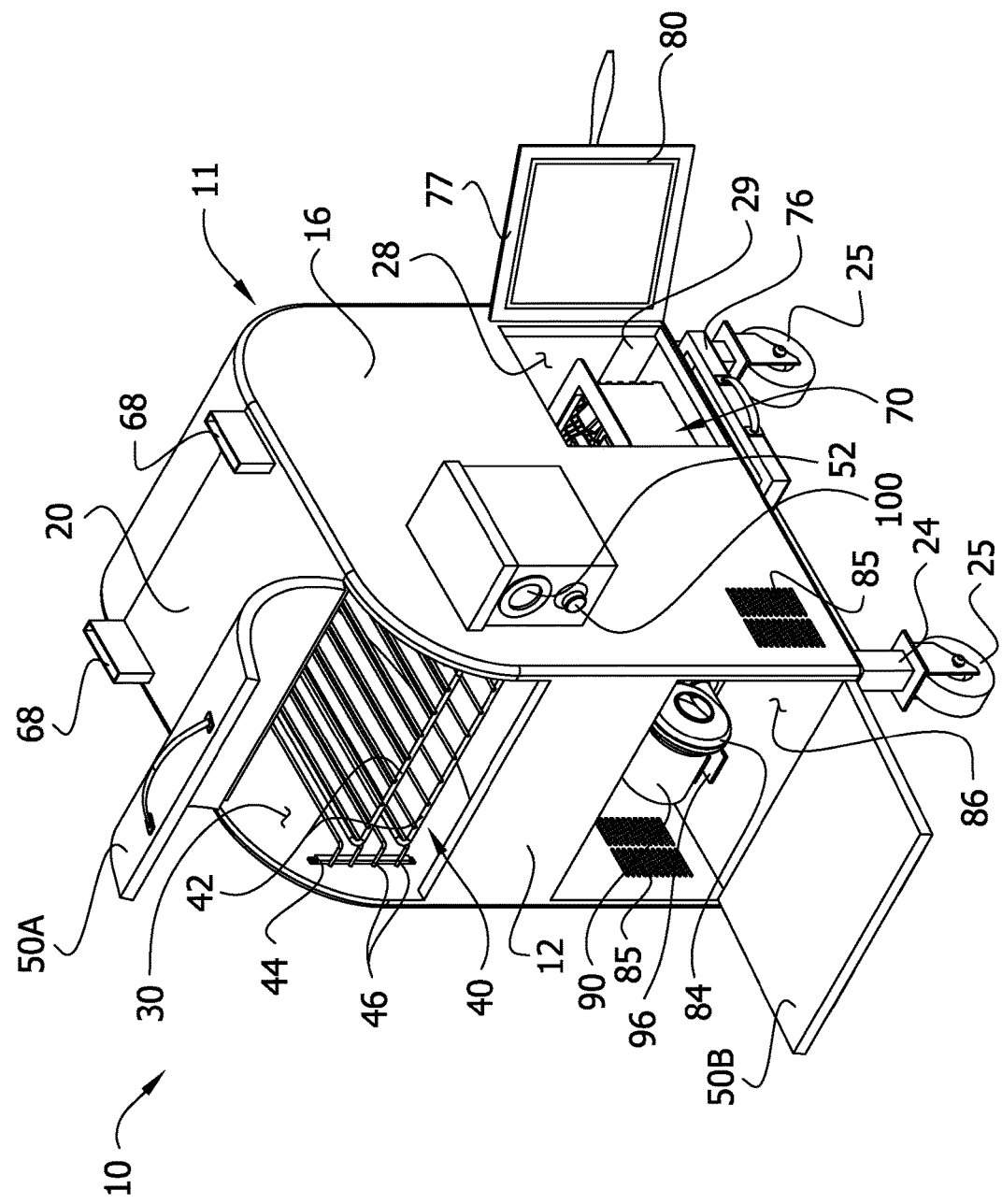
FIG. 2 is a right side perspective of the barbecue oven with doors open to show internal construction.
Figure 3:
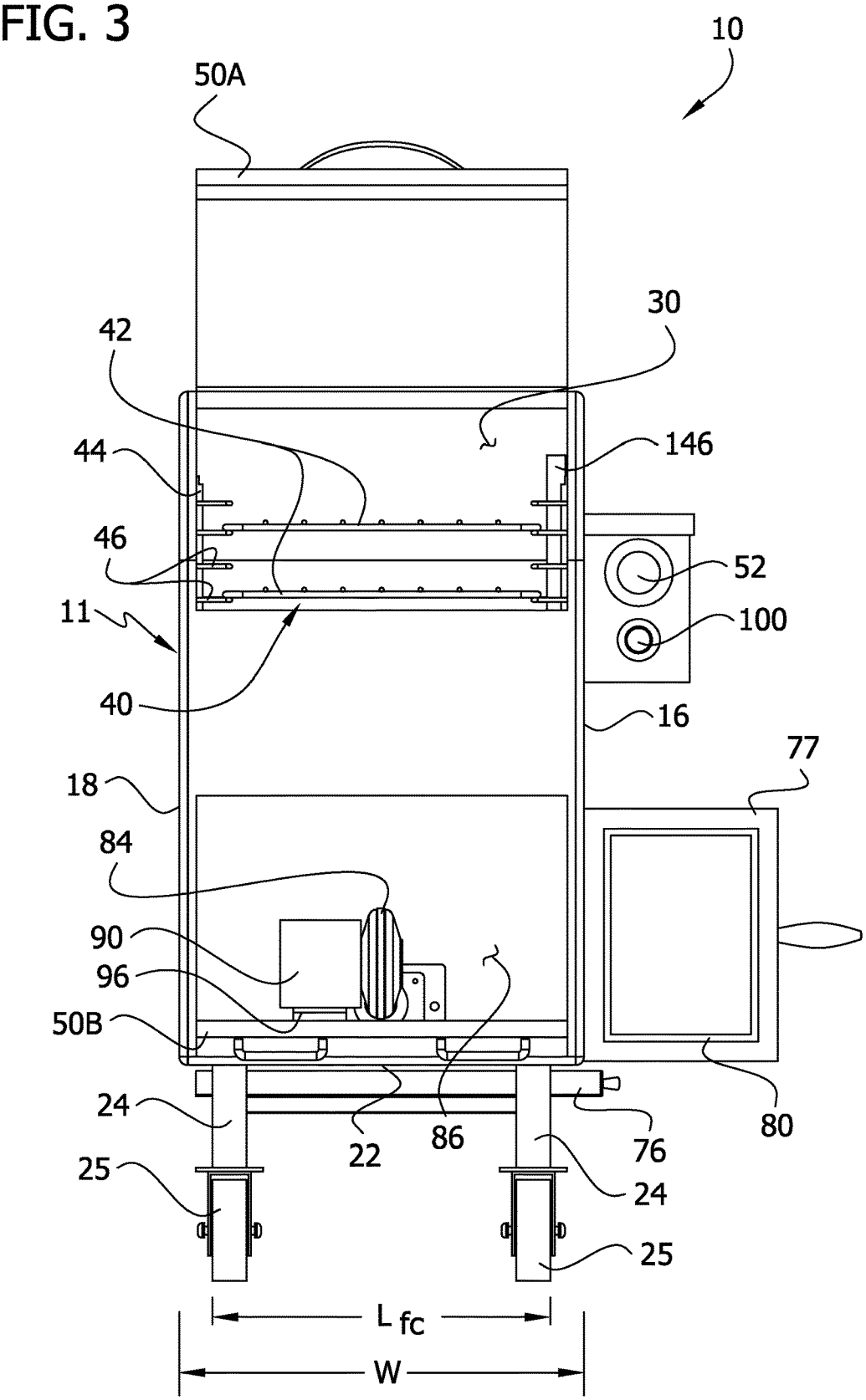
FIG. 3 is a front elevation of the barbecue oven shown in FIG. 2.

Referring now to the drawings and in particular to FIGS. 1-5, a barbecue oven that efficiently circulates heat and smoke around food in the oven is designated generally by reference numeral 10. For the purpose of illustration, the invention will be described in conjunction with a barbecue oven. The invention, however, should not be limited to this specific use, as it is instead intended that the invention be used in any application in which circulation of heated air around food is to be employed. The oven 10 includes a housing, indicated generally at 11 which comprises a front wall 12, back wall 14, side walls 16, 18, a top 20 and a bottom 22. The front, back and side walls 12, 14, 16, 18 define wall members which together form vertical walls of the housing 11. The walls 12, 14, 16, 18, top 20 and bottom 22 are preferably seam welded together to form the housing 11. The number of wall members forming the vertical wall may be other than described without departing from the scope of the present invention. The housing 11 is supported by legs 24 extending from the bottom 22 to position the oven 10 above an underlying floor F. Wheels 25 may be used to facilitate transport of the oven 10. For the purposes of this description, the legs 24, wheels 25 and any other supporting structure are considered part of the housing 11. The housing is suitably constructed of heat resistant materials such as stainless steel. Other metals or porcelain coated materials suitable for use in cooking ovens can also be utilized. The oven 10 may include insulation material (not shown) in various parts of the oven to help maintain temperatures in the oven and to protect users from heat generated by burning fuel in the oven. Insulation may comprise a double-wall construction of the walls 12, 14, 16, 18, 20, 22 of the housing 11. The double-wall structure may also include insulating material between the walls such as high-temperature mineral wool or other non-combustible materials.

Figure 4:
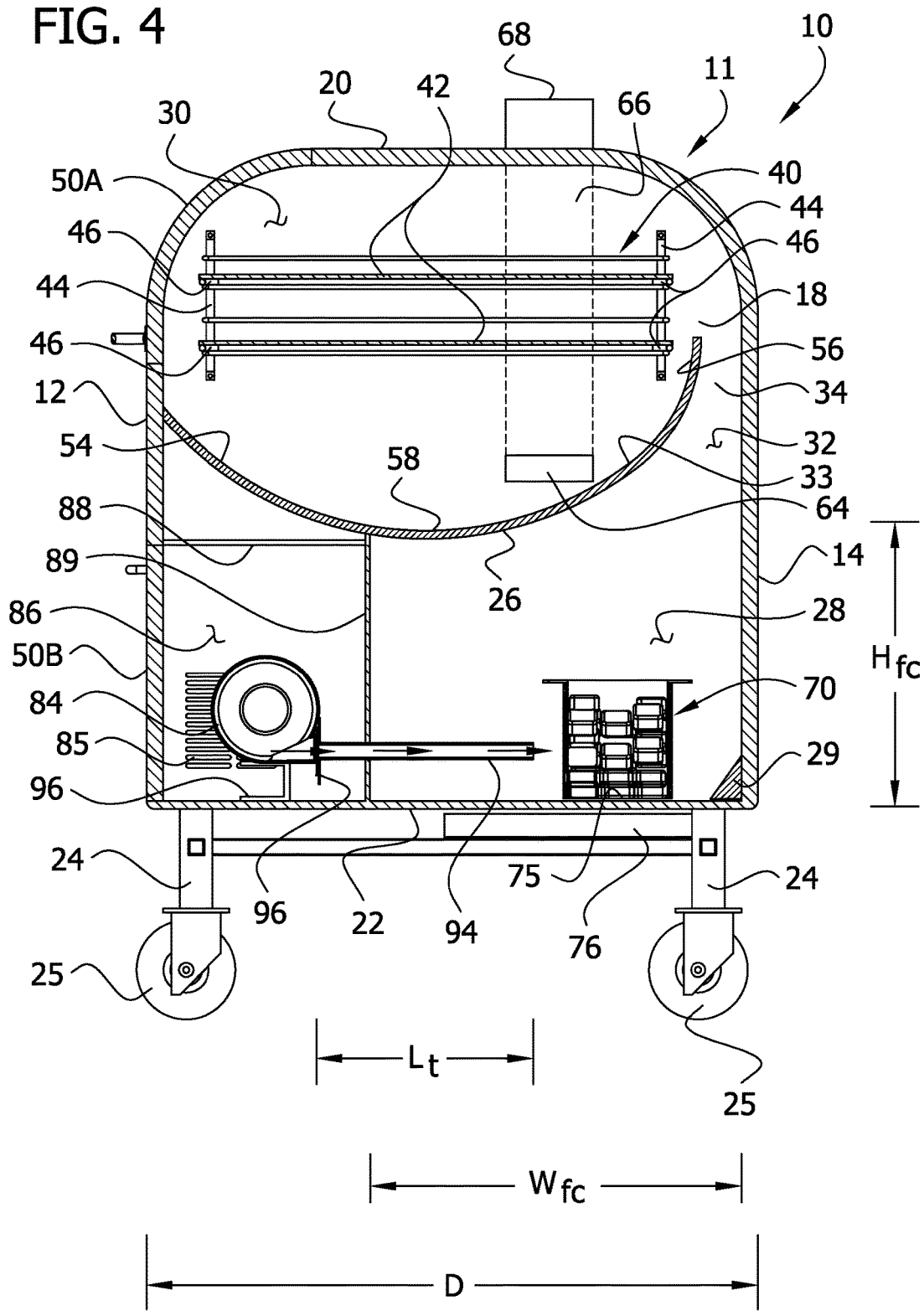
FIG. 4 is a vertical section of the barbecue oven.

A heat flow regulating fire wall 26 divides the interior of the oven 10 into a fire chamber 28 and a cooking chamber 30. In one embodiment, the firewall 26 extends between the opposite side walls 16, 18 along a width W of the oven 10 (FIG. 3) and extends from the front wall 12 to near the back wall 14 along a depth D of the oven (FIG. 4). The fire chamber 28 has an approximate length $L_{fc}$ of about 2 ft., an approximate height $H_{fc}$ of about 1.08 ft., and an approximate width $W_{fc}$ of about 1.58 ft. Therefore, the fire chamber 28 has an approximate volume of about 3.4 cubic feet. An angled plate 29 is welded to the bottom 22 and back wall 14. The fire chamber 28 is in the lower part of the oven beneath the firewall 26, and the cooking chamber 30 is above the firewall. Thus, the oven 10 has a generally vertical orientation, with the cooking chamber 30 located above the fire chamber 28. The firewall 26 has a generally arcuate shape with a back portion 33 that extends upward to form a tapered duct 32 having a throat, or outlet 34 between the firewall and the back wall 14. The duct 32 is defined by the back portion 33 of the firewall 26, a portion of the back wall 14 generally opposing the back portion and sections of the side walls 16, 18 extending between the back portion and opposing portions of the back wall. It is believed that heated air and smoke from the fire chamber 28 is provided with an upward thrust by the angled plate 29 and passes through the throat 34 to the cooking chamber 30, as will be more fully explained below. The shape of the firewall 26 may be described as a segment of an ellipse (FIG. 4). One or more flanges (not shown) extending from the firewall 26 to the back wall 14 may be used to secure the firewall to the back wall without substantially blocking the throat 34. The firewall 26 is fixed to the front wall 12 and the side walls 16, 18 of the housing 11 by welding. However, the firewall 26 can be fixed to the housing 11 using suitable brackets and fasteners (not shown) without departing from the scope of the invention. Continuous seam welds are preferred, at least in the region of the fire chamber 28. For ovens such as the oven 10 described in the present invention, a firewall like firewall 26 is preferred for controlling heat flow in the oven.

A food rack, indicated generally at 40, is located within the cooking chamber 30. As shown, the food rack 40 includes a series of slidable horizontal shelves 42 supported on brackets 44 that are secured to the side walls 16, 18 of the housing 11. Each bracket 44 includes vertically spaced rails 46, each aligned with a corresponding one of the rails 46 on the bracket 44 on the opposite side wall 16 or 18. The rails 46 of each pair of aligned rails receive opposite edge margins of one of the racks 42 to support the rack in the cooking chamber 30. Generally speaking, the food rack 40 may have various configurations including rotating slits, rotisserie wheels, baskets or even stationary shelves without departing from the scope of the invention.

A lid or door 50A makes up a portion of the front wall 12 and the top 20 of the housing 11 and provides access to the cooking chamber 30. The door 50A may have a heat resistant glass window (not shown) located therein to allow the user to monitor the food product being cooked without having to open the door. A thermometer 52 may be mounted on side wall 18 adjacent the door 50A to indicate the temperature inside the cooking chamber 30 of oven 10 to monitor the heat produced in the fire chamber 28 as will be explained in greater detail below. It will be understood that the thermometer 52 may have other locations on the oven 10 without departing from the scope of the present invention. During operation of the oven 10, the door 50A is typically closed except when inserting food or retrieving food from the oven.

In one embodiment, the firewall 26 is shaped with a front edge 54, back edge 56 and middle portion 58 (FIG. 4). The back edge 56 is located vertically higher in the oven 10 than the middle portion 58 such that the firewall 26 has a concave shape opening upward toward the cooking chamber 30. The position of the firewall 26 below the food rack 40 permits the firewall to act as a drip pan for catching grease and other meat drippings produced by food while it is cooking on the racks 40. It will be understood that the firewall may have other configurations within the scope of the present invention.

The heated air and smoke in the cooking chamber 30 circulate in a generally circular or elliptical path around the food products on the food rack 40, flowing up the rear wall 14, across the top 20 of the cooking chamber, down the front wall 12, and over the fire wall 26. The accelerated current of heated air and smoke passing through the throat 34 of the tapered duct 32 entrains the air in the cooking chamber 30 to provide momentum and to keep the air circulating in this circular pattern. The accelerated heated air stream flowing through the tapered duct 32 reduces heat stratification in the cooking chamber 30, even when there is no artificial means to circulate the air within the cooking chamber. Thus, this circulation path within the oven 10 is configured to eliminate the need for baffles, flues or convection fan blades (not shown) located in the cooking chamber 30 for distributing the heated air around the food products being cooked. The shape of the duct 32 and cooking chamber 30 may have other configurations without departing from the scope of the present invention. Moreover, baffles, flues and or convection fan blades may be used with the present invention although less desirable.

In one embodiment, smoke exits the cooking chamber 30 through one or more portals 64 located in the sidewalls 16, 18 of the housing. The portals 64 (only one illustrated in FIG. 4) serve as openings into exhaust ducts 66 contained within the sidewalls 16, 18. Desirably, the portals 64 are located in the sidewalls 16, 18 so that the portals are below the bottom-most portion of the food rack 40. This location of the portals 64 facilitates removal of smoke in an amount and rate which promotes circulation of smoke and maintenance of smoldering solid fuel in the fire chamber 28. Thus, food in the oven is properly flavored by the smoke without being over-exposed to the smoke. The exhaust ducts 66 desirably have a bottom surface that slopes upward from the interior surface of the sidewall to the outward surface of the exhaust duct so that any grease splattering into the portals 64 is discouraged from accumulating in the ducts. The exhaust ducts 66 are suitably about 4 inches wide and about ¾ of an inch deep and form a conduit leading to exhaust stacks 68 near the top 20 of the oven 10 which can be open to the atmosphere or connected to a suitable chimney. The exhaust stacks 68 extend from the housing 11 above the sidewalls 16, 18 so as to not interfere with the door 50A. Ambient heat in the cooking chamber 30 is transferred through the side wall 16, 18 to the confined space in the exhaust duct 66 to aid in transporting the smoke. When heated, the exhaust ducts 66 transport heat and smoke through the exhaust stacks 68 to the atmosphere, promoting the circulation of the smoke and heat within the cooking chamber 30. Other means for venting smoke from the cooking chamber 30 are contemplated without departing from the scope of the invention.

Figure 6:
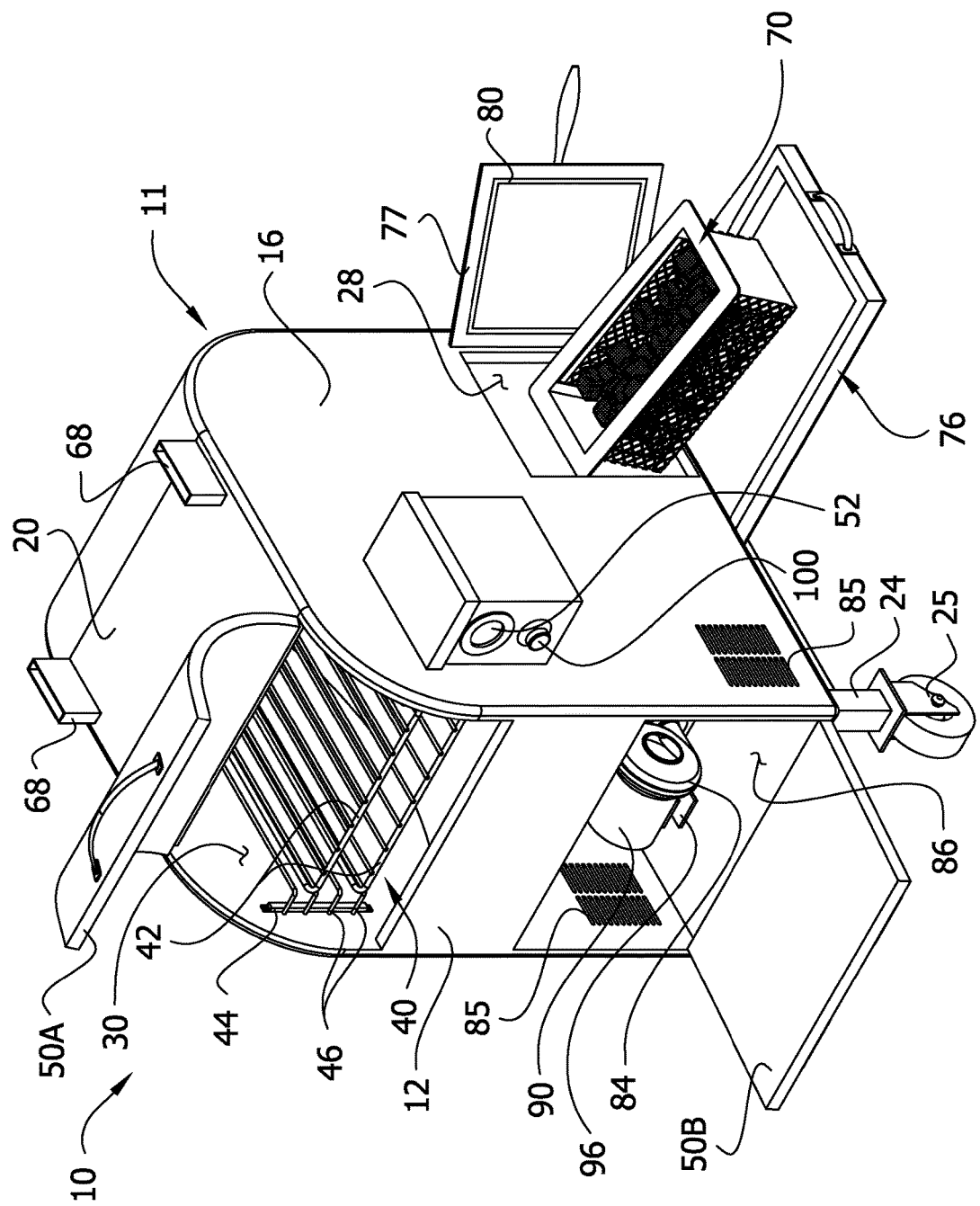
FIG. 6 is a perspective of the barbecue oven as shown in FIG. 2 with a charcoal basket partially removed and supported by an ash tray.
Figure 7:
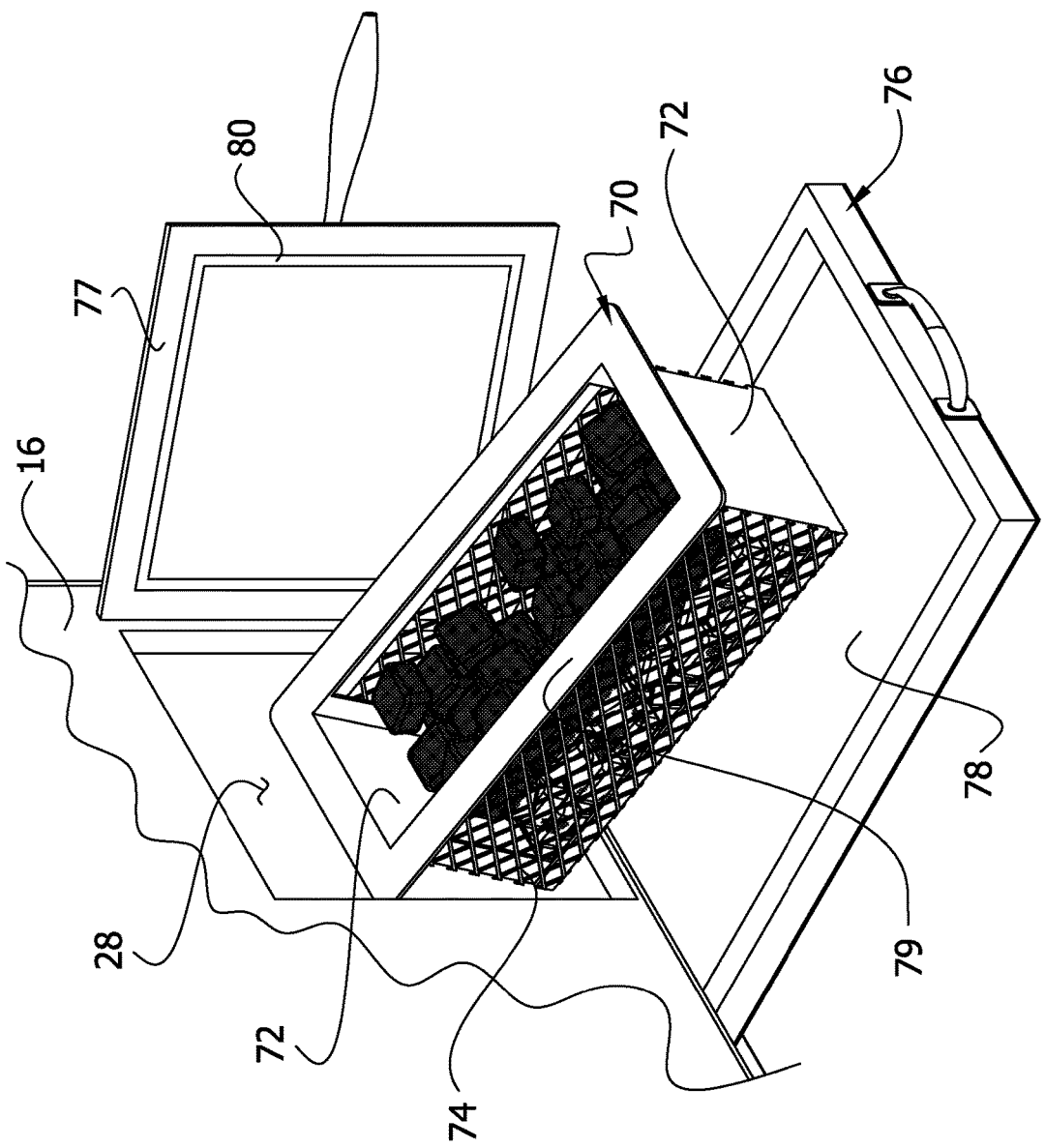
FIG. 7 is an enlarged fragmentary perspective showing the charcoal basket and ash tray.
Figure 8:
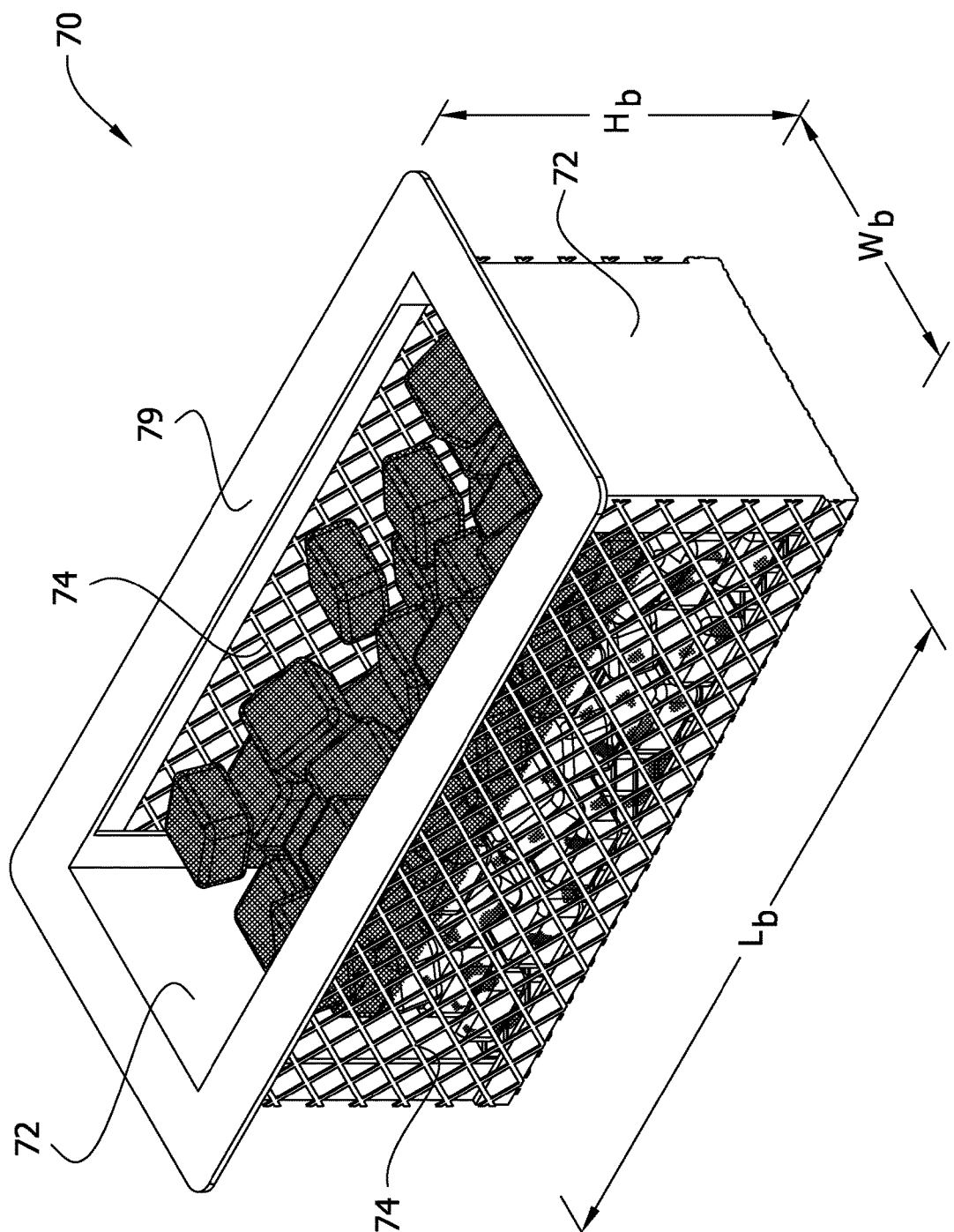
FIG. 8 is a perspective of the charcoal basket filled with ignited and unignited charcoal.

The fire chamber 28 contains a charcoal basket (broadly, "a solid fuel vessel") generally indicated at 70. The charcoal basket 70 holds combustible material such as charcoal or charcoal bricks and other fuels besides charcoal. The charcoal basket 70 may also contain a relatively small quantity of smoke producing material such as wood chips, wood chucks or pellets (not shown). Referring to FIGS. 6 and 7, the charcoal basket 70 includes downwardly extending end walls 72 and downwardly extending mesh side walls 74 that lead to a substantially planar bottom wall 75 (FIG. 4). As best seen in FIG. 8, the charcoal basket 70 is suitably elongated in shape and spans nearly the entire width W of the oven 10. As illustrated, the charcoal basket has a length $L_b$ of about 19 in., a height $H_b$ of about 7 in. and a width $W_b$ of about 6 in. Thus, the illustrated charcoal basket 70 has a height to width ratio of about 1.2. In one embodiment, the charcoal basket 70 has a ratio of height $H_b$ to width $W_b$ of at least about 1. An upper flange 79 extends outwardly around the top of the charcoal basket 70. The charcoal basket 70 is accessible and removable through a side door 77. The door 77 is provided with a gasket 80 to seal the fire chamber 28 when the door is closed. In the illustrated embodiment, the charcoal basket 70 is partially formed from expanded metal. However, other suitable configurations of the charcoal basket 70 are within the scope of the invention.

Beneath the bottom 22 of the oven 10, below the charcoal basket 70, is a removable ash tray 76 for collecting expended ash material. The ash tray 76 includes a substantially horizontal planar member 78. The ash tray 76 is mounted below side wall 16 and suitably removable from below the oven 10 for convenient emptying of the ash. The ash tray 76 can also be partially removed (FIG. 6) to serve as a support for the charcoal basket 70 when loading the charcoal into the charcoal basket as will be explained in greater detail below. In another embodiment (not shown), an ash tray could be formed integral with the bottom of an oven and slidable out from a fire chamber conjointly with a charcoal basket carried by the ash tray.

Figure 5:
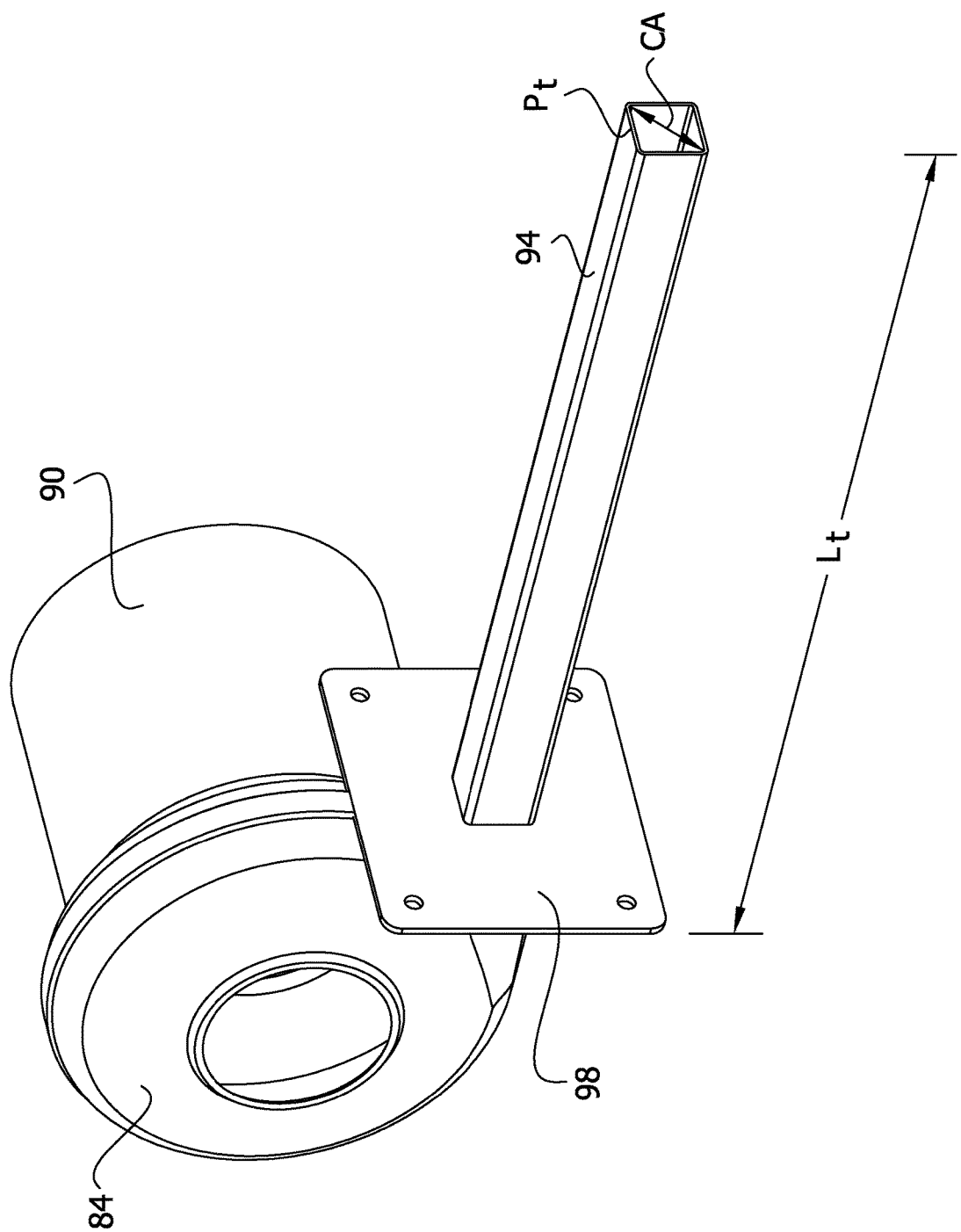
FIG. 5 is a perspective of a blower and tube of the barbecue oven.

A blower 84 is located in a forward compartment 86 behind the front wall 12 of the housing 11 adjacent the fire chamber 28. The compartment 86 comprises a top wall 88 and side wall 89. A door 50B closes off the compartment 86 to the surrounding environment. However, vents 85 allow the blower 84 to draw in air from the surrounding environment for operation. The blower 84 is mounted in the compartment 86 in a suitable manner such as by a bracket 96. A square tube 94 is attached to an outlet of the blower 84 by a flange 98 and extends through an opening in side wall 89 and into the fire chamber 28. The tube 94 has a length $L_t$ of about 16 in., an inside perimeter $P_t$ of about 3 in., and a uniform cross-sectional area CA of about 0.56 in$^2$ (FIG. 5). Thus, the tube 94 has an internal surface area of about 48 in$^2$. Therefore, the ratio of the internal surface area to the cross-sectional area of the tube 94 is about 85 to 1. In one embodiment, the ratio is at least about 20 to 1. In another embodiment, the ratio is at least about 50 to 1. The tube 94 extends about 7½ in. into the fire chamber 28 to a position about 1 to about 5 in. (2.5 to 12.7 cm.) from the charcoal basket 70. Therefore, the tube 94 extends into the fire chamber 28 a distance greater than a greatest cross sectional dimension of the tube. In the illustrated embodiment, the charcoal basket is not located in the fire chamber 28 by any specific structure. However, it is envisioned that a locating element (not shown) could be use to precisely position the charcoal basket 70 in the fire chamber 28 with respect to the end of the tube 94. Also, multiple tubes and/or multiple blowers (not shown) can be used to accommodate larger ovens requiring larger charcoal baskets. For example, a single blower could exhaust into a manifold from which several tubes extend into the fire chamber.

The blower 84 has a motor 90 which directs air though the tube 94 directly into the charcoal basket 70. The tube 94 directs the air from the blower 84 to a position about mid-height and mid-length of the charcoal basket 70 and generally perpendicular to the side walls 72 of the charcoal basket. The tube 94 is free of any dampers, vents, baffles or any other devices for regulating air flow. Also, there are no heating elements disposed between the end of the tube 94 and the charcoal basket 70. In fact, there are no heating elements within the fire chamber 28. The blower motor 90 can be an electric motor capable of operating at various speeds. However, in the illustrated embodiment, the blower motor 90 operates at a single speed generating an air flow rate of about 1600 FPM. The length $L_t$ and cross-sectional area of the tube 94 produce an air flow rate generally at the end of the tube between about 820 to about 850 FPM (about 3.2 to about 3.3 cubic feet/min). Thus, the ratio of the approximate volume of the fire chamber 28 and the volumetric flow rate generally at the end of the tube 94 is between about 1 to 1 and about 1 to 1.5.

In the illustrated embodiment, a thermostat 100, broadly a controller, is mounted on the housing 11 and is connected to the blower motor 90 by electrical wiring and controls in a conventional manner. The thermostat 100 is adjusted to maintain a desired temperature within the cooking chamber 30 by switching the blower 84 on and off. As shown in FIG. 1, thermocouples 102, broadly temperature sensors, are mounted in the cooking chamber 30 of the housing 11 and provide temperature input to the thermostat 100. The thermocouples are secured to a mount 144. The thermocouples 102 may be secured within the cooking chamber 30 at other locations within the scope of the present invention. Further, a protective screen 146 covers and protects thermocouple tubes and connectors (not shown) while also allowing the ambient air of the cooking chamber 30 to flow around the tubes and connectors for more accurate measurements.

The thermostat 100 may be a conventional thermostat such as a Robertshaw 5300-17E and may use simple logic or may receive input from additional thermocouples (not shown) and use staged or sequenced logic. However, in one embodiment only simple logic is used. When the desired temperature is achieved, (suitably between about 150 degrees F. and about 250 degrees F., the thermostat 100 automatically turns off the blower 84. When the temperature in the cooking chamber 30 falls sufficiently below the desired temperature, such as to a range between about 5 degrees F. and about 10 degrees F., the thermostat 100 turns the blower 84 on, thus reestablishing combustion in the solid fuel and restoring the cooking chamber 30 to the desired temperature. In this manner, the thermostat 100 controls the blower 84 to restore combustion of the fuel and maintain the air temperature within the oven 10 within a predetermined range. One of the reasons a simple logic thermostat is used is because it is easy calibrate. More complex thermostats may require a trained professional to perform the calibration. Also, the electronics associated with complex thermostats are susceptible to damage when they experience elevated temperatures such as those required for cooking food in an oven. The thermostat 100 of the present invention needs only a small set screw (not shown) for calibration. However, it is understood that a thermostat having complex functions could be used in the present invention. The complex functions, however, are not necessary to maintain temperature control. One example of a feature that could be present in both a simple or complex logic thermostat is a cook and hold feature where the thermostat is programmed to drop the temperature in the cooking chamber 30 after a certain period of time (e.g., at end of cooking cycle). This feature keeps the cooked food warm without further cooking (e.g., 225 F to 150 F).

In use, the charcoal basket 70 can be partially removed from the fire chamber 28 and supported on the ash tray 76 to provide access to the charcoal basket (FIG. 6). The charcoal basket 70 can also be completely removed from the fire chamber 28 and supported by the floor F. The charcoal basket 70 is then filled half way with ignited charcoal. The remaining portion of the charcoal basket 70 is filled with unignited charcoal such that the top half of the charcoal basket is occupied by the unignited charcoal. The charcoal basket 70 is then placed in the fire chamber 28 and the door 77 is closed to seal off the fire chamber. It is understood that the charcoal could also be loaded into the charcoal basket 70 while the charcoal basket is completely housed in the fire chamber 28. Other proportions of ignited and unignited charcoal could be used, including using all ignited charcoal.

The thermostat 100 can then be set to a desired temperature for cooking food in the cooking chamber 30. In a preferred embodiment, the thermostat 100 is set to a temperature between about 150 and about 250 degrees F. The sensor 102 in the cooking chamber 30 then senses the temperature in the cooking chamber. If the temperature is below the desired temperature, the thermostat 100 will turn on the blower 84 so that the blower blows air through the tube 94 and onto the charcoal in the charcoal basket 70. A combustion reaction is produced when the oxygen in the air energizes the ignited charcoal releasing smoke and heat which cause the temperature in the fire chamber 28 to rise, thus causing the temperature in the cooking chamber 30 to rise. The blower 84 will remain on, producing a sufficient air flow to energize the ignited charcoal and increase the temperature in the cooking chamber 30 until the desired temperature is reached. When the desired temperature is reached the thermostat 100 automatically turns the blower 84 off. For purposes of this description, this type of thermostat is considered to be an "on/off control." Once the desired temperature in the cooking chamber 30 is reached, the oven 10 is configured to maintain this temperature for an extended period of time. In addition to the configuration of the tube 94 and blower 84 which will be explained below, the housing 11 and firewall 26 of the oven 10 are sized and shaped to help maintain the cooking chamber 30 at the desired cooking temperature. The tapered duct 32 formed by the fire wall 26 and the rear wall 14 of the housing create a choke that prevents a large influx of air and heat leaving the fire chamber 28, limiting the draw into the fire chamber through back pressure. Inhibiting the charcoal in the fire chamber 28 from overfiring allows the heat in the cooking chamber to be maintained at a steady temperature for extended periods of time. Also, the size and location of the portals 64 leading to exhaust ducts at the bottom of the cooking chamber 30 help to control the flow of air in the cooking chamber. Smoke is exhausted in an amount and at a rate which promotes circulation of the smoke in the cooking chamber and maintenance of the fuel in the fire chamber 28. This provides additional control over the temperature in the cooking chamber 30.

However, with the blower 84 off, the source of oxygen to the fuel (charcoal) is substantially removed; therefore the temperature in the fire chamber 28 will eventually begin to gradually decrease causing the temperature in the cooking chamber 30 to decrease. Once the temperature in the cooking chamber 30 decreases by an amount of about 5 to about 10 degrees F., the thermostat 100 will automatically turn the blower 84 back on, blowing air into the charcoal basket 70 to reenergize the ignited charcoal to again raise the temperature in the fire chamber 28 so that the temperature in the cooking chamber also raises, back to the desired cooking temperature. Once the desired cooking temperature is reached again, the thermostat 100 automatically turns the blower 84 back off. It will be understood that over time the energized ignited charcoal will burn such that it will light the unignited charcoal above the ignited charcoal, replenishing the fuel source to maintain the cooking chamber 30 at the desired temperature for cooking the food. Moreover, adding additional unlit charcoal to the basket 70 facilitates the continued combustion reaction aiding in the maintenance of the desired cooking temperature in the cooking chamber 30.

The size and length of the tube 94, and the range of about 820 to about 850 FPM for the flow rate of the air at the end of the tube are selected because they provide a rapid elevation of the temperature in the oven 10 without "over firing" the charcoal. Over firing is a condition that occurs when too much oxygen is supplied to the charcoal to the point where the combustion reaction continues of its own accord, creating its own draw to supply additional oxygen. The charcoal will continue to ignite even after the blower has been tuned off. This will result in a spike in the temperature above the desired cooking temperature. This is not ideal when cooking foods at low and slow temperatures, such as when smoking foods. Further, the oven 10 is configured such that the reintroduction of charcoal to the fire chamber 28 can be performed while the oven is in operation without running the risk of over firing the charcoal and spiking the temperature in the cooking chamber 30. Even with the fire chamber door 77 open, the tapered duct 32 and the location of the portals 64 help control the temperature in the cooking chamber 30.

In addition to the size and length of the tube 94, and the flow rate generated in the tube, the tube directs air to a location that is about mid-height and mid-length of the charcoal basket 70 so that the charcoal in the charcoal basket is evenly energized and ignited. Also, the square shape of the tube 94 is believed to produce a turbulent flow of air causing the air to disperse or spread along the charcoal basket 70. This dispersion of air is not as easily produced with a round tube which generates substantially laminar flow. Thus, the location to which the tube 94 directs air into the charcoal basket 70 along with the shape of the tube further reduce the chance of over firing the charcoal.

Generally speaking, the use of the ignited charcoal to begin the process eliminates the need for any heating elements such as gas or electric burners to provide the heat source necessary to create the combustion cycle described above. The pre-ignited charcoal also reduces the initial heating time needed to reach the desired cooking temperature. The charcoal itself is preferred because the uniform pieces provide a stable and predictable temperature change within the fire chamber 28. Additional solid fuel sources such as woodchips, wood chucks or pellets may be used to produce added smoke and to flavor the food being cooked.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A barbeque oven for cooking foods comprising:
a housing including a fire chamber and a cooking chamber disposed generally above the fire chamber;
a vessel receivable in the fire chamber and adapted to hold combustible material therein to generate heat and smoke for cooking food in the cooking chamber;
a blower mounted on the housing, the blower being selectively operable to control a temperature of the fire chamber by turning the blower on and off; and
a tube including an internal surface area and a cross sectional area, the ratio of the internal surface area to cross sectional area being at least about 40:1, the tube being attached to an outlet of the blower and extending into the fire chamber such that when the vessel is received in the fire chamber the tube extends to a position adjacent the vessel, the tube having a longitudinal axis and an open distal end for air to exit the tube in a direction along the longitudinal axis, wherein the tube projects into the fire chamber to a location such that a distance extending along the longitudinal axis of the tube between the open distal end of the tube in the fire chamber and the vessel when the vessel is received in the fire chamber is between about 1 and about 5 inches (about 2.5 to about 12.7 centimeters) for preventing over-firing of combustible material in the vessel to maintain a steady temperature in the cooking chamber.

2. The barbeque oven of claim 1 wherein the tube has a generally rectangular shaped cross section.

3. The barbeque oven of claim 1 wherein the tube extends at least about 7½ inches (about 19 centimeters) into the fire chamber.

4. The barbeque oven of claim 1 wherein the fire chamber has a volume, the blower being configured to blow air through the tube to produce a volumetric flow rate generally at the open distal end of the tube in the fire chamber, the ratio of the volume of the fire chamber to the volumetric flow rate generally at the open distal end of the tube being between about 1 to 1 and about 1 to 1.5.

5. The barbeque oven of claim 4 wherein the blower has a single speed when operating.

6. The barbeque oven of claim 5 further comprising an on-off thermostat control mounted on the oven and in communication with the blower for selectively operating the blower.

7. A barbeque oven for cooking foods comprising:
a housing including a fire chamber, a cooking chamber disposed generally above the fire chamber, and a food rack disposed in the cooking chamber;
a vessel receivable in the fire chamber and adapted to hold combustible material therein to generate heat and smoke for cooking food on the food rack in the cooking chamber;
a blower mounted on the housing for blowing air in the housing;
a tube attached to an outlet of the blower and extending into the fire chamber such that when the vessel is received in the fire chamber the tube extends to a position adjacent the vessel for directing air from the blower to the vessel, the tube having a longitudinal axis and an open distal end for air to exit the tube in a direction along the longitudinal axis, the tube projecting into the fire chamber to a location such that a distance extending along the longitudinal axis of the tube between the open distal end of the tube in the fire chamber and the vessel when the vessel is received in the fire chamber is between about 1 and about 5 inches (about 2.5 to about 12.7 centimeters) for preventing over-firing of combustible material in the vessel to maintain a steady temperature in the cooking chamber;
a wall disposed between the fire chamber and the cooking chamber, the wall separating the food rack in the cooking chamber from the vessel when received in the fire chamber to block line of sight exposure of all combustible material when held in the vessel to food when on the food rack; and
a controller connected to the blower to control a temperature in the cooking chamber by turning the blower on and off in response to a detected temperature in the cooking chamber, the controller being controlled to control the temperature in the cooking chamber using only simple logic by turning the blower off when a desired temperature is achieved in the cooking chamber and turning the blower on when the temperature in the cooking chamber falls below the desired temperature.

8. The barbeque oven of claim 7 wherein the blower is configured to operate at a single speed.

9. The barbeque oven of claim 8 wherein the blower and housing are configured to generate an air flow rate of about 1600 FPM, a volumetric flow rate of the air generally at an end of the tube in the fire chamber when the blower is operating being between about 3.2 to about 3.3 cubic feet/min.

10. The barbeque oven of claim 7 wherein the controller comprises an on-off thermostat control mounted on the oven.

11. The barbeque oven of claim 7 wherein when the blower is off air supply to the fuel is substantially removed.

12. The barbeque oven of claim 7 wherein the controller is configured to maintain the temperature in the cooking chamber between about 150 degrees F. and about 250 degrees F.

13. The barbeque oven of claim 7 wherein the tube has an internal surface area and a cross sectional area, the ratio of the internal surface area to cross sectional area being at least about 40 to 1.

14. The barbeque oven of claim 13 wherein the ratio of the internal surface area to cross sectional area is at least about 85 to 1.

15. The barbeque oven of claim 7 wherein the tube has a generally rectangular cross section.

16. The barbeque oven of claim 7 wherein the fire chamber has a volume, the blower being configured to blow air through the tube to produce a volumetric flow rate generally at the open distal end of the tube in the fire chamber, the ratio of the volume of the fire chamber to the volumetric flow rate generally at the open distal end of the tube being between about 1 to 1 and about 1 to 1.5.

* * * * *